Aug. 21, 1923.
W. D. COLLINS ET AL
1,465,596
DIRECTION AND STOP SIGNAL
Filed March 29, 1919  3 Sheets-Sheet 2
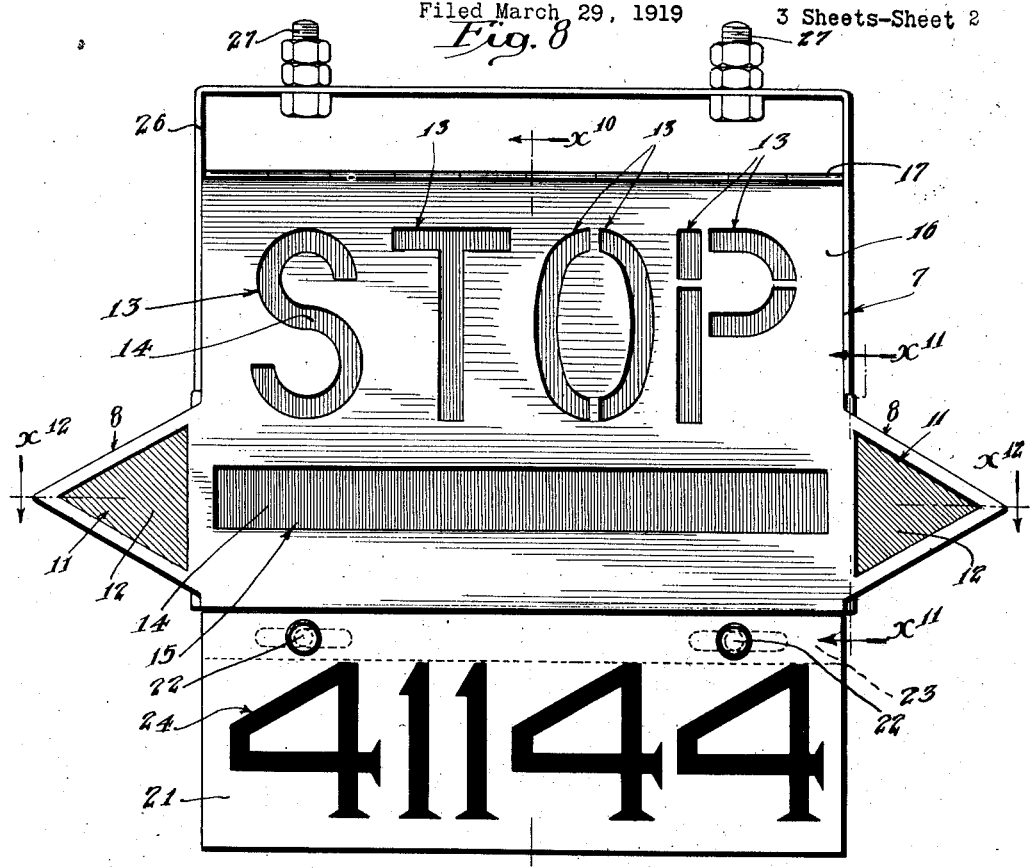
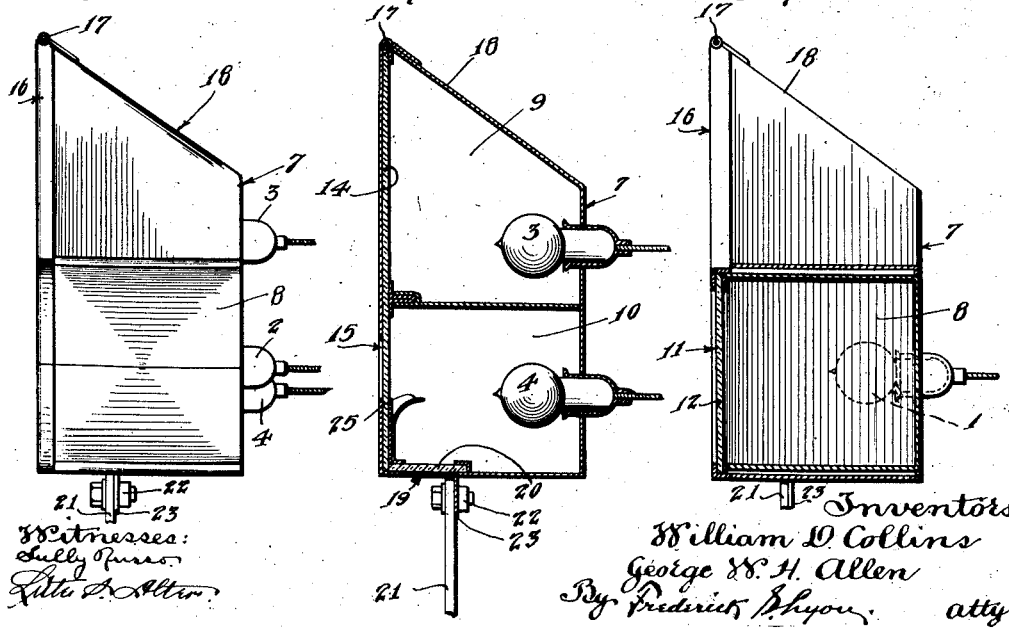

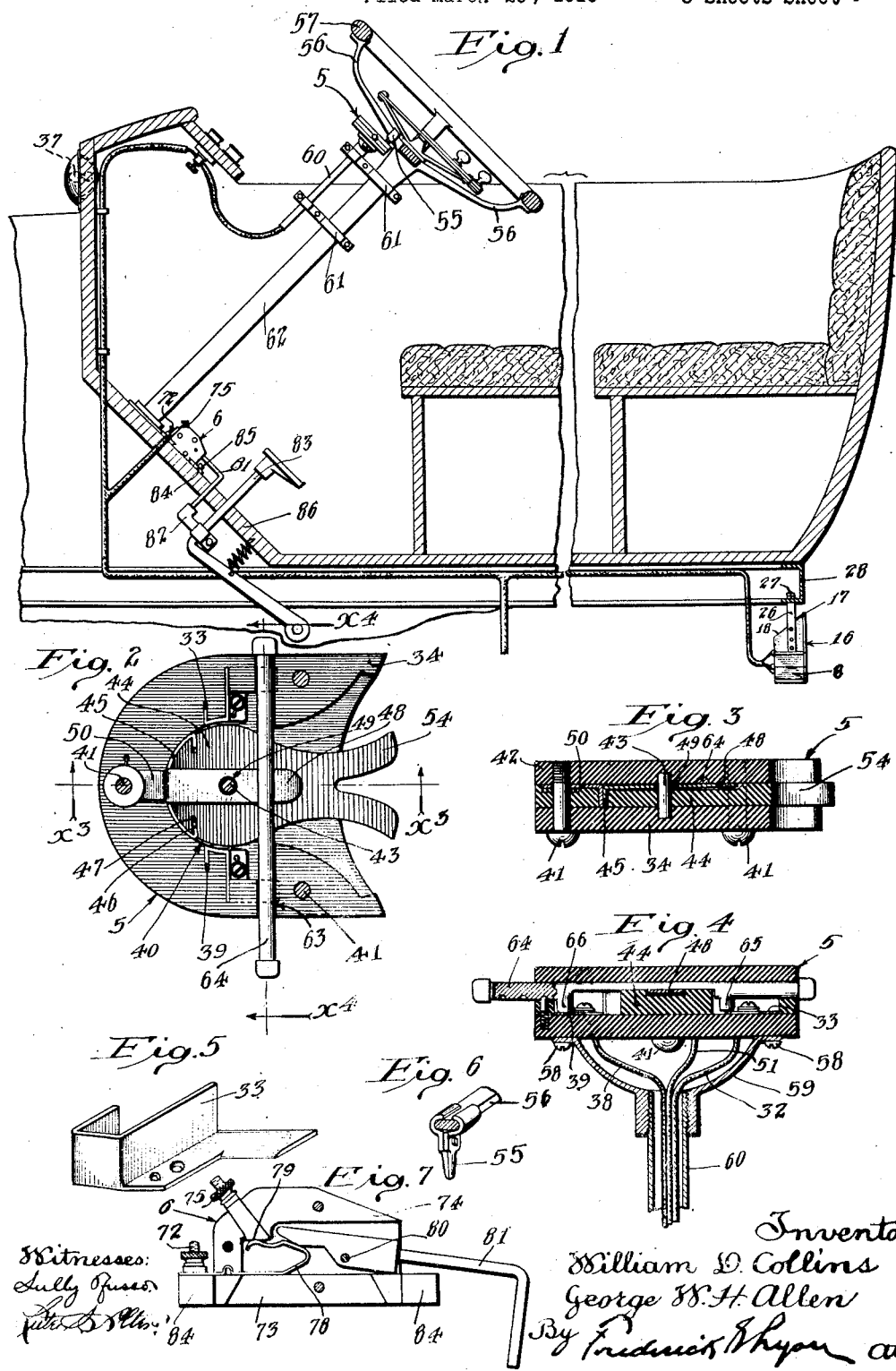

Aug. 21, 1923.
W. D. COLLINS ET AL
1,465,596
DIRECTION AND STOP SIGNAL
Filed March 29, 1919    3 Sheets-Sheet 3
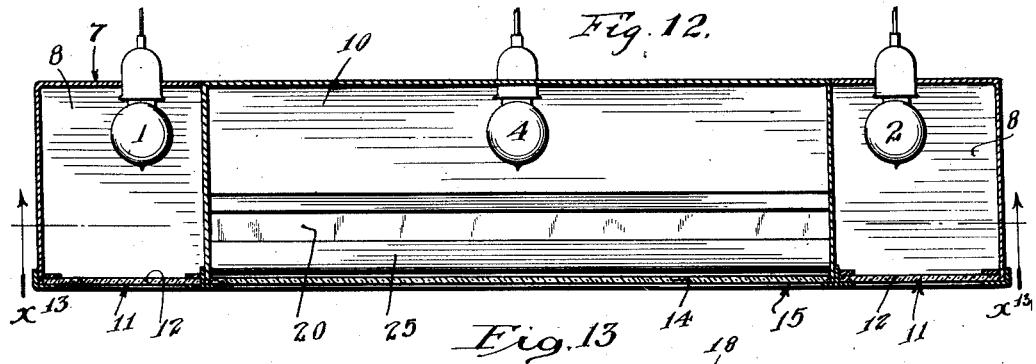
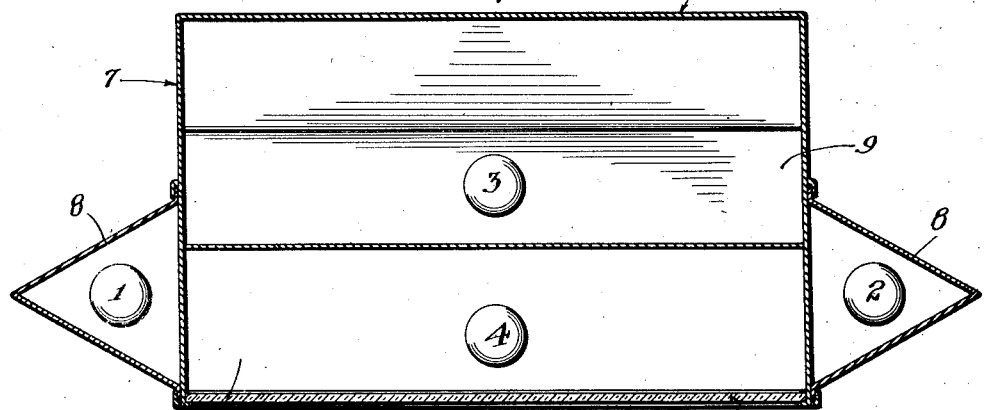
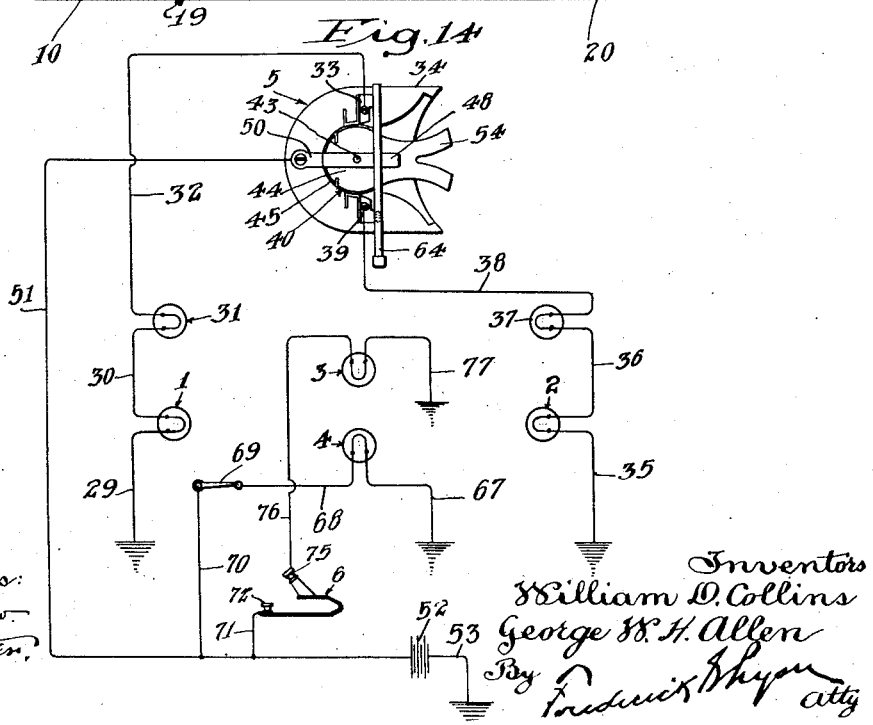
Witnesses:
Inventors
William D. Collins
George H. Allen
By Frederick Bryan
atty Patented Aug. 21, 1923.

1,465,596

UNITED STATES PATENT OFFICE.

WILLIAM D. COLLINS AND GEORGE W. H. ALLEN, OF CAZENOVIA, NEW YORK.

DIRECTION AND STOP SIGNAL.

Application filed March 29, 1919. Serial No. 286,089.

*To all whom it may concern:*

Be it known that we, WILLIAM D. COLLINS and GEORGE W. H. ALLEN, both citizens of the United States, residing at Cazenovia, in the county of Madison and State of New York, have invented new and useful Direction and Stop Signals, of which the following is a specification.

This invention relates to means for indicating in which direction a vehicle is about to turn and when the vehicle is about to come to a stop and an object of the invention is to effect the display of either one of three different signals by a construction that is convenient for the driver of the vehicle to operate.

Another object is to make provision for displaying the direction signal automatically as well as by manual control.

Another object is to provide a construction which will automatically cause retraction of the manually operated switch-control member when the steering member of the vehicle is turned to bring the steering wheels of the vehicle in straight-ahead position.

Another object is to provide for display of the stop signal when the brake lever is operated to set the brakes.

Another object is to provide a direction and stop signal on which the license number plate can be mounted and which will illuminate said license number plate.

Other objects and advantages will appear in the subjoined detail description.

The accompanying drawings illustrate the invention:

Figure 1 is a side elevation of a construction embodying the invention, fragments of the automobile on which the invention is mounted also being shown.

Fig. 2 is a plan view of the switch for controlling the display of the direction signals, the cover of the switch being omitted so as to expose to view the internal mechanism.

Fig. 3 is a sectional elevation on line indicated by $x^3$—$x^3$, Fig. 2.

Fig. 4 is a sectional elevation on line indicated by $x^4$—$x^4$, Fig. 2.

Fig. 5 is a perspective view of one of the electric contacts in the switch shown in Fig. 2.

Fig. 6 is a perspective view of the member for operating the switch shown in Fig. 2, a portion of one of the spokes of the steering wheel on which the member is mounted also being shown.

Fig. 7 is an enlarged side elevation of the switch for controlling the display of the stop signal, a portion of the switch cover being omitted so as to expose to view the internal mechanism.

Fig. 8 is a front elevation of the signal box.

Fig. 9 is a side elevation of Fig. 8 omitting the bracket, and the license number plate being partly broken away.

Fig. 10 is a sectional elevation on line indicated by $x^{10}$—$x^{10}$, Fig. 8, the license number plate being partly broken away.

Fig. 11 is a side elevation partly in section on line indicated by $x^{11}$—$x^{11}$, Fig. 8, the license number plate being partly broken away.

Fig. 12 is a plan section on line indicated by $x^{12}$—$x^{12}$, Fig. 8.

Fig. 13 is a sectional elevation on line indicated by $x^{13}$—$x^{13}$, Fig. 12.

Fig. 14 is a diagrammatic view indicating the electrical connections.

The invention comprises left and right direction signal lamps 1, 2, a stop signal lamp 3, a tail lamp 4, a switch 5 for controlling the direction indicating lamps 1 and 2, and a second switch 6 for controlling the energization of the stop indicating lamp 4.

The lamps 1, 2, 3 and 4 are mounted in a signal box indicated in general by the character 7, the lamps 1 and 2 being mounted in separate compartments 8 at opposite sides of the box, the lamp 3 being mounted in a separate compartment 9 of the box and the lamp 4 being mounted in a separate compartment 10 of the box. The compartments 8 are provided at their front ends with arrow head shaped windows 11 having window panes 12 which may be of light-transmitting material such as colored glass. For example, the window panes 12 may be of green glass. The compartment 9 is provided at its front end with windows 13 in the form of letters of the alphabet, the windows being of a shape and arrangement to spell the word "Stop." The windows 13 are provided with a window pane 14 and said window pane may extend downwardly to cover a window 15 in the front end of the compartment 10. The window pane 14 may be of any suitable color of glass or other light-transmitting material. For example, the pane 14 may be made of red glass. The window 15 extends from side to side of the compartment 10 to form the arrow shaft in line with the windows 11.

The window panes 12 and 14 are mounted in a door member 16 in which the windows 11, 13 and 15 are formed. The door 16 is hinged at 17 to the top 18 of the signal box. Thus it is clear that when the door 16 is opened access may be had to the interior of each of the compartments 8, 9 and 10 so that if the lamps 1, 2, 3 and 4 should become burned out they may be readily replaced by others. The compartments 8 are triangular in vertical section and are at opposite ends of the compartment 10, and the compartment 10 is beneath the compartment 9. The compartments 8 thus form wings at the opposite sides of the signal box 7.

The compartment 10 is provided in its bottom with a window 19 and said window is provided with a window pane 20, preferably of transparent material such as glass, so that some of the light from the lamp 4 can pass through the window 19 and illuminate a license number plate 21 fastened by bolts 22 or their equivalents to a downwardly extending flange 23 on the under side of the bottom of the signal box 7. The license number plate 21 may be provided with a license number such as that indicated at 24 in Fig. 8. The front portion of the compartment 10 is preferably provided with an inwardly curved shield or deflector 25 to aid in throwing the light rays at a suitable angle through the window 19 so that they strike the license plate 21. The upper edge of the shield 25 is substantially at the level of a plane passing through the middle of the lamp 4 so that part of the rays of said lamp will pass above the shield 25 through the window 15 and other rays will be deflected downwardly and rearwardly through the window 19.

A suitable bracket is provided for suspending the signal box 7 from a suitable part of the automobile and in this instance the signal box 7 is fastened at its opposite sides to an inverted U-shaped bracket 26 which is adapted to be fastened by bolts 27, or their equivalents, to the frame 28 or other portion of the automobile. In Fig. 1 the signal box 7 is shown suspended from the rear end of the frame 28.

The lamps 1, 2 are suitably connected with the switch 5 and, though the electrical connections hereinafter to be described, may be varied to suit different conditions, the electrical connections shown in Fig. 14 are those which, for purposes of description, will be described and which serve to cause functioning of the device. In Fig. 14 the lamp 1 is grounded by a wire 29 to the frame 28 and is connected by a wire 30 to one of the front lamps 31 of the automobile. The lamp 31 is preferably provided with a green lens. The front lamp 31 is connected by a wire 32 to a contact member 33 mounted in the switch base 34 of the switch 5. The lamp 2 is grounded by a wire 35 to the frame 28 and is connected by a wire 36 to the other front lamp 37 of the automobile. The lamp 37 is preferably provided with a green lens. The lamp 37 is connected by a wire 38 to a contact member 39 similar in construction to the contact member 33 and also mounted in the base 34. The contact members 33, 39 are oppositely arranged adjacent the sides of a recess 40 in the base 34. Fastened to the base 34 by screws 41 is a cover 42 and pivoted between the base 34 and cover 42 by a pin 43 is an arm 44 which is accommodated in the recess 40. The arm 44 is provided with a curved resilient contact 45 which is provided with inwardly bent ends 46 to engage notches 47 in the periphery of the arm 44. When the arm 44 is turned in one direction it causes the contact 45 to engage the contact member 33 and when the arm 44 is turned in the other direction it causes the contact 45 to engage the contact 39. The contact 45 forms a spring or resilient extension 48 provided with an orifice 49 to receive the pin 43, said orifice being larger than the diameter of the pin 43 so that the contact 45 is free to spring outwardly to make good electrical contact with the contact members 33 or 39 as the case may be. The contact member 45 engages at all times a contact member 50 which is positioned intermediate of the contact members 33, 49 and this contact member 50 is connected, as shown in Fig. 14, by a wire 51 to an electrical current source 52 which in turn is grounded by a wire 53 to the frame 28.

From the foregoing it is clear that when the arm 44 is turned counterclockwise in Fig. 14 it causes energization of the lamps 2 and 37, and that when the arm 44 is turned clockwise it causes energization of the lamps 1 and 31. One end of the arm 44 projects outwardly from the recess 40 and forms a fork 54 which is engaged by a finger 55 fixed to and projecting downwardly from one of the spokes 56 of the steering wheel 57 of the automobile. Thus, when the steering wheel is turned, it causes turning of the arm 44 and consequent energization of one or the other of either the lamps 1, 31 or lamps 2, 37 according to whether said wheel is turned counterclockwise or clockwise.

To the base 34 is fastened by screws 58 a spider 59 into which is screw-threaded a tube 60 through which the electrical connections 32, 38, 51 may extend as clearly shown in Fig. 4. The tube 60 is supported by suitable brackets 61 fixed to the steering column 62 of the automobile.

Means are provided to manually control the energization of the lamps 1, 2 and such means a switch and are constructed as follows: The switch base 34 is provided with grooves 63 which communicate at their inner ends with the recess 40. Positioned in the grooves 63 and shiftable endwise therein is a push rod 64 which passes across the arm 44 and engages the upper face of the contact extension 48 that is more or less resilient so as to always make good electrical contact with the arm 44. The rod 64 is provided with downwardly projecting contact members 65, 66, the contact member 65 engaging with the contact member 33 when the rod 64 is pushed to the right in Fig. 4, and the contact member 66 engaging with the contact member 39 when the rod 64 is pushed to the left. The contact members 65, 66 form abutments which extend into the path of travel of the arm 44 and said contact members 65, 66 are so positioned relative to one another and to the periphery of the arm 44 that, when the rod 64 is in its intermediate position with the contact members 65, 66 out of engagement with the contact members 33, 39 respectively, the contact members 65, 66 will not be engaged by the arm 44 when said arm is moved to the right or left. If the rod 64, however, should be in position to cause engagement of the contact members 65, 33 clockwise movement of the arm 44 will move said arm against the contact member 66 to cause retraction of the rod 64 to intermediate position and thus disengaging the contact member 65 from the contact member 33. On the other hand if the rod 64 has been pushed to the left to the position shown in Fig. 2 so as to engage the contact member 66 with the contact member 39 counterclockwise movement of the arm 44 will move said arm against the contact member 65 to cause the rod 64 to be shifted to intermediate position to disengage the contact member 66 from the contact member 39. Thus the arm 44 not only functions to cause energization of the lamps 1 and 31 or lamps 2 and 37, according as the arm 44 is turned clockwise or counter-clockwise, but said arm 44 also functions to retract the rod 64 to intermediate position and thus break the contacts 65, 33 or 66, 39 according as the arm 44 is turned clockwise or counterclockwise. It is also clear that energization of the lamps 1 and 31 or 2 and 37 may be caused by manually shifting the rod 64 to the right or left.

It will be clear from the foregoing that the switch 5 comprises the arm 44, contacts 45, 50 and portions of the contacts 33, 39, and that the push rod 64 with its contacts 65, 66, the contact extension 48 and portions of the contacts 33, 39 constitute a manually-operated switch operative by the switch 5 to open the manually-operated switch after the latter switch has been closed. The finger 55 and fork 54 constitute one form of means, operated by the steering gear, to connect the switch 5 to the steering gear.

The tail lamp 4 is grounded by a wire 67 to the frame 28 and is connected by a wire 68 to a switch 69 which in turn is connected by a wire 70 to the wire 51. Thus, when the switch 69 is closed, the tail lamp 4 is energized whether or not the lamps 1, 2, 3, 31, 37 are energized.

The wire 51 is connected by a wire 71 to a binding post 72 of the switch 6 which will now be described. The binding post 72 is mounted in the switch base 73 and a cover 74 is mounted on the base 73. The cover 74 is provided with a binding post 75 which is connected by a wire 76 to the lamp 3 that is grounded by a wire 77 to the frame 28. Fastened at one end on the base 73 by the binding post 72 is a spring or resilient contact member 78, the free end of which is upwardly and rearwardly bent and adapted to engage a contact 79 formed by the inner end of the binding post 75 so as to establish a circuit and thus energize the lamp 3. Pivoted to the cover 74 by a pin 80 is a lever 81, the inner end of said lever overhanging the contact member 78 and the outer end of said lever being downwardly bent and connected by a clamp 82 to the foot brake lever 83 of the automobile. When the brake lever 83 is up in non-braking position as in Fig. 1 the inner end of the lever 81 is depressed and thus holds the contact member 78 out of engagement with the contact member 79. When the lever 83 is depressed to set the brakes the inner end of the lever 81 is in the retracted position shown in Fig. 7 so as to permit the contact member 78 to engage the contact member 79. Thus it is clear that when the driver depresses the brake lever 83 to set the brakes he at the same time operates the switch so as to cause energization of the lamp 3. The base 73 of the switch 6 is fastened by suitable means, as cleats 84 and screws 85, to the floor 86 of the automobile.

The operation of the invention is as follows: When the driver desires to indicate, before making a turn to the right or left, that he is about to make such turn, he will press the push rod 64 to the left or right, as the case may be, and thus cause engagement of the contacts 66, 39 or the contacts 65, 33, as the case may be, so as to energize the right-hand lamps 2, 37, or the left-hand lamps 1, 31, as the case may be. The driver will then turn the steering wheel 57 clockwise or counterclockwise to cause the automobile to make the turn, in a manner well understood in the art pertaining to steering gears, and such movement of the wheel moves the arm 44 counter-clockwise or clockwise to restore the arm 64 to neutral or intermediate position and at the same time to bring the contact 45 into engagement with the contact 39, or 33, as the case may be, to maintain the lamp energization circuit unbroken. When a straight course is to be resumed the driver will turn the steering wheel 57 counter-clockwise or clockwise, as the case may be, and this reverse movement of the steering wheel 57 causes the arm 44 to be returned to intermediate position as in Fig. 2 to break the contacts 45, 39 or 45, 33, as the case may be, without engaging the rod 64. If the driver turns the steering wheel 57 clockwise or counter-clockwise without first indicating that he is about to turn, as just described, the turning of the steering wheel and consequent turning of the arm 44 will of course move the contact 45 into engagement with the contact member 39 or 33, as the case may be, so as to energize the lamps 2 and 37, or lamps 1 and 31 and thus establish the circuit without employing the switch rod 64.

When the driver desires to stop the automobile he will depress the brake lever 83, in the usual manner, to set the brakes and this movement of the brake lever will raise the inner end of the arm 81 so as to permit the contact member 78 to spring upward against the contact member 79, thus causing energization of the lamp 3, the rays of which will strike through the window pane 14 so as to illuminate the sign "Stop" and the window 15.

The invention in its broader phases is not limited to the exact details of construction described above and shown in the drawings, but the invention also includes such changes and modifications as lie within the spirit and scope of the appended claims.

We claim:

1. The combination with the steering gear of a vehicle, of means including a forked member operatable to either of two positions to close different electric circuits, a finger connected with the steering gear and engaging the fork when the steering gear is in the straight ahead position, said finger disengaging the fork when the steering gear is operated a predetermined extent to effect turning of the vehicle to one side or the other, manually operable means to close either of said circuits in advance of the operation of the steering gear and operatable to circuit-opening position by movement of the forked member to circuit-closing position.

2. The combination with the steering gear of a vehicle, of means including a forked member operatable to different positions to close different electric circuits, and a finger connected with the steering gear and engaging the fork when the steering gear is in the straight ahead position, said finger disengaging the fork when the steering gear is operated a predetermined extent to effect turning of the vehicle to one side or the other.

3. The combination with a vehicle having a steering gear, of a pivotally mounted member rotatable in opposite directions by movement of the steering gear in effecting "right" and "left" turns of the vehicle, an electric contact on said member, an electric contact engaged by the first contact, an endwise shiftable member provided with a pair of electric contacts and operable manually in opposite directions in advance of said movements of the steering gear and operable to normal position by return movement of the first member effected by the steering gear returning the vehicle to a straight away course, said last member engaging the second contact, and stationary contacts adapted to be selectively engaged by the contacts on the rotatable and endwise shiftable members.

Signed at Los Angeles, California, this 22d day of March, 1919.

WILLIAM D. COLLINS.
GEORGE W. H. ALLEN.

Witnesses:
GEORGE H. HILES,
L. BELLE WEAVER.